Patented Nov. 18, 1930

1,782,036

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

HEAT PLASTIC COMPOSITION

No Drawing.   Application filed April 27, 1927. Serial No. 187,112.

This invention relates to a composition of matter suitable for the production of composite constructions and particularly to a composition of matter which has as its principal constituent a heat-plastic isomer of rubber having a less chemical saturation than rubber.

It has heretofore been proposed to utilize rubber isomers of the character indicated as a bonding agent between rubber and other materials and in one method of this use it is the practice in making composite constructions comprising rubber to coat the contacting surfaces of the rubber or other material, or both, with the rubber isomer, subject the assembled product to pressure and to elevated temperatures, both for the purpose of vulcanizing the rubber and for effecting the adhesion between the component parts of the article. Such products have been normally found to be satisfactory where the article is permitted to cool under pressure after removal from the heat source. However, when pressure is removed from the articles before cooling, the rough handling incident to the pulling of the articles from the heated presses or molds frequently causes in factory operations a separation of the parts of the composite article, thus producing a relatively large number of defective articles.

The present invention is based upon the discovery that if the rubber isomer is admixed with small percentages of materials of various kinds which give to the rubber isomer a greater tensile strength and resistance to flow when hot, the articles need not be cooled under pressure. I have found that the following materials, which fall into no well recognized chemical class but which may be considered to constitute an empirical group, accomplish satisfactorily the hereinabove described purpose: lead oleate, lead linoleate, lead palmitate, lead stearate, lead benzoate, lead acetate, lead carbonate, lead chromate, lead chloride, tetra methylthiuram disulfide, tetra ethyl diamino disulfide, mercury oleate, aluminum oleate, sodium oleate, magnesium oleate, manganese linoleate, cobalt linoleate, potassium, palmitate, potassium stearate, blue lead, tellurium, selenium, casein, wood flour, gluten, graphite, asbestos powder, antimony sulfide, manganese dioxide.

In carrying out one embodiment of this invention, a heat-plastic rubber isomer such as is normally used for the adhesion of rubber to metal is admixed with a quick drying organic solvent to form fluids of suitable consistency and 10 to 30 parts of any of the above indicated ingredients are dispersed therein. Satisfactory results have been obtained with a lesser quantity than the 10 parts herein specified but for commercial operations the ratio of 10 parts of the compound to 100 parts of the rubber isomer appears to give more satisfactory results. Alternatively, the rubber isomer and any of the above ingredients may be first intimately admixed, and then dispersed in an organic solvent to form a spreadable coating material. In either case, the rubber isomer admixture is applied as a paint or film to the surfaces of the materials to be joined, the solvent allowed to evaporate. The constituent parts are then assembled to form the composite product, which is subjected to heat and pressure to effect the desired union.

In the case that it is desired to produce a composite product of wood and rubber, the wood is coated with the treated rubber isomer solution, the solvent permitted to evaporate, and then a vulcanizable rubber composition is superimposed thereon and the assembled product put in a press and heated for such time and at such temperature as to effect the proper vulcanization of the rubber. At the end of the vulcanization period, the composite product may be removed from the press, even though it may stick thereto, without any danger of the component parts of the product separating due to the rough handling in the removal of the product.

While I have specifically mentioned hereinabove a large number of substances which will be effective to produce the desired results of the present application, it is to be understood that other materials may be employed, and that the materials which are effectively operative are those materials or compounds which given to a rubber isomer at elevated temperatures a greater tensile strength and higher resistance to flow. The present application is therefore not limited to the substances herein mentioned but is intended to include other materials having these characteristic properties, and I consequently do not desire to limit the scope of this application except as it may be restricted by the prior art. The words "rubber isomer" as employed in the claims include substances containing carbon and hydrogen in the same ratio as the rubber hydrocarbon, but not products which have been saturated or partially saturated by the addition of oxygen, hydrogen, halogen or other atoms to the double bonds of the rubber molecule.

I claim:

1. A composition of matter comprising a heat plastic rubber isomer having a less chemical unsaturation than rubber and lead salt of a higher fatty acid.

2. A composition of matter comprising a heat plastic isomer of rubber having a less chemical unsaturation than rubber and lead oleate.

3. A composition of matter comprising a heat plastic rubber isomer having a less chemical unsaturation than rubber and a substance selected from a group comprising lead oleate, lead linoleate, lead palmitate, lead stearate, lead benzoate, lead acetate, lead carbonate, lead chromate, lead chloride, tetra methylthiuram disulfide, tetra ethyl diamino disulfide, mercury oleate, aluminum oleate, sodium oleate, magnesium oleate, manganese linoleate, cobalt linoleate, potassium palmitate, potassium stearate, blue lead, tellurium, selenium, casein, wood flour, gluten, graphite, asbestos powder, antimony sulfide, manganese dioxide.

4. A composition of matter comprising a heat plastic rubber isomer having a less chemical unsaturation than rubber intimately admixed with a salt of a heavy metal with a higher fatty acid.

5. A composition of matter comprising a heat plastic rubber isomer having a less chemical unsaturation than rubber intimately admixed with a salt of a heavy metal with an unsaturated higher fatty acid.

In witness whereof I have hereunto set my hand this 20th day of April, 1927.

HAROLD GRAY.